United States Patent [19]
Webber

[11] 3,725,761
[45] Apr. 3, 1973

[54] SERVO CORNER COMPENSATION FOR PHOTOELECTRIC ROTARY SCAN LINE TRACERS

[75] Inventor: Henry Webber, Dundas, Ontario, Canada

[73] Assignee: Westinghouse Canada Limited, Hamilton, Ontario, Canada

[22] Filed: Oct. 22, 1971

[21] Appl. No.: 191,743

[30] Foreign Application Priority Data

Oct. 26, 1970 Canada..................................096,473

[52] U.S. Cl. ....................318/577, 318/571, 318/621
[51] Int. Cl. ..............................................G05b 19/36
[58] Field of Search......................318/577, 571, 621

[56] References Cited

UNITED STATES PATENTS

| | | |
|---|---|---|
| 3,004,166 | 10/1961 | Greene............................318/577 X |
| 2,933,668 | 4/1960 | Brouwer...........................318/577 |
| 3,286,142 | 11/1966 | Redman............................318/577 |
| 3,215,914 | 11/1965 | Patterson..........................318/577 |

Primary Examiner—T. E. Lynch
Attorney—R. H. Fox

[57] ABSTRACT

Rotary scanning pattern tracers observe the pattern at points in advance of the steering center of the follower. When due to other requirements, the circle of scan is large. This may result in rounding off of sharp corners, because in effect the center of steering is trailed along behind the forward scanning point. By selection of suitable steering signal delay characteristics this error can be reduced.

3 Claims, 3 Drawing Figures

SERVO CORNER COMPENSATION FOR PHOTOELECTRIC ROTARY SCAN LINE TRACERS

BACKGROUND OF THE INVENTION

This invention relates to rotating scan line tracers, and in particular means to improve the accuracy of tracing. It has been known for many years to control a machine tool, such as a gas cutting machine and cause it to perform convolutions in accordance with a pattern by means of optically following a line. Such line tracers, as they are called, view the pattern in various manners. The present invention has particular application to those situations where the pattern is scanned by means of a rotary scan, although it may have applications in other situations. An example of a line tracer of the type referred to is disclosed in copending Canadian application Ser. No. 065,212, filed Oct. 20, 1969 now abandoned, and assigned to the assignee of the present invention.

When the line tracer is used to control the operation of a machine tool, it is quite common for the pattern to be drawn to the exact size of the material while the machine tool, whether it be a router or gas cutting machine or milling tool, actually removes a certain amount of material on either side of its point of rotation, i.e., its steering point or its effective center.

In gas cutting art, this material is referred to as kerf and in order to avoid the necessity of drawing patterns larger than the material actually desired, it is conventional to adjust the line tracer to compensate for the kerf of the cutting tool. In order to do this, it is necessary for the tracer in fact to follow a line outside the actual pattern by producing an offset. In order that the tracer can actually see the pattern and at the same time follow a line outside the pattern, it is necessary that the scan is of such diameter that while following the desired path, the scanner can still observe the pattern. Following this line of reasoning it will be seen that the diameter of scan will be related to the required kerf adjustment and indeed, one of the limiting factors determining the diameter of scan is the amount of kerf adjustment required.

A consideration of the operation of steering and pattern following will show that for the ultimate in accuracy, the steering point of the system will coincide with the observed point on the pattern. This mode of operation is not practical because of the resultant ambiguity and in fact it is necessary to observe the point slightly in advance of the steering point to produce the necessary stability in the system. The amount of the advance required for stability however is much less than that required to permit kerf adjustment and if the advance, that is, the distance between the point of steering and the observed point on the pattern is increased sufficiently to allow for necessary kerf, errors start to occur which are appreciable and as will be later shown, these errors are related to the amount of the advance.

It is an object of the present invention to reduce the errors produced by the advance and thereby produce a more accurate reproduction of the pattern.

In accordance with this invention this object is attained by introducing into the steering system a variable time delay which is a function of the advance of the system and the velocity. By suitable adjustment of the time delay, the tracer can be caused to more nearly approximate the actual contours of the pattern and by relating the time delay to the velocity of the machine, the correction can be made virtually independent of the machine velocity.

A clearer understanding of the invention may be had from consideration of the following specification together with the drawings, in which.

Figure 1:
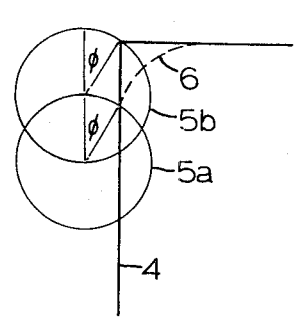
FIG. 1 is an illustration of the type of error which is sought to be overcome.

Considering FIG. 1, there is shown a portion of a line pattern designated 4. At the upper part of the figure the line pattern suddenly turns at right angles and proceeds in this new direction. The scanning pattern of the tracer is illustrated at 5a and 5b. As shown in 5a, in order to produce the desired kerf, the tracer follows the pattern with its directional axis deflected theta degrees from its direction of travel, the angle theta being a function of actual kerf desired. As will be seen at 5b, when the tracer reaches this point, the scan encounters the right angle turn in the pattern. In order to keep the angle theta constant, that is the angle between the line joining the point of intersection of the scan with the pattern and the center of the scan and the line representing the directional axis of the tracer, it will be necessary for the directional axis to rotate. The dashed line 6 is a line illustrating the course of the cut made by the tool as the tracer follows the pattern and it will be observed that the corner is rounded off, starting at a point determined by the diameter of the scan.

Figure 2:
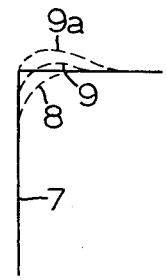
FIG. 2 is a series of curves indicating the results of the introduction of varying degrees of delay.

In FIG. 2 there is shown a similar pattern 7 and a first dotted line 8 which corresponds to line 6 on FIG. 1 which is the course of the cut with no modification in the system. Line 9 represents the course of the cut with the introduction of a delay and 9a represents the course of the cut when a greater delay is introduced. In order to appreciate the meaning of the term "delay" as used in this description, let us now consider FIG. 3.

In this figure there is shown a tracer 10 which views a pattern 11 carried by a support such as a table 12. The output from the tracer is applied together with a velocity signal from control 13 to the velocity resolver 14. This velocity resolver converts the velocity from control 13 into a pair of control signals which control the X and Y drives 19 and 20 which in turn control the movements of the tracer and its associated machine tool. The signals from the tracer are such that the output from the velocity resolver causes the X and Y drives to move the tracer over the pattern with a constant tangential velocity substantially following the various convolutions of the pattern.

Figure 3:
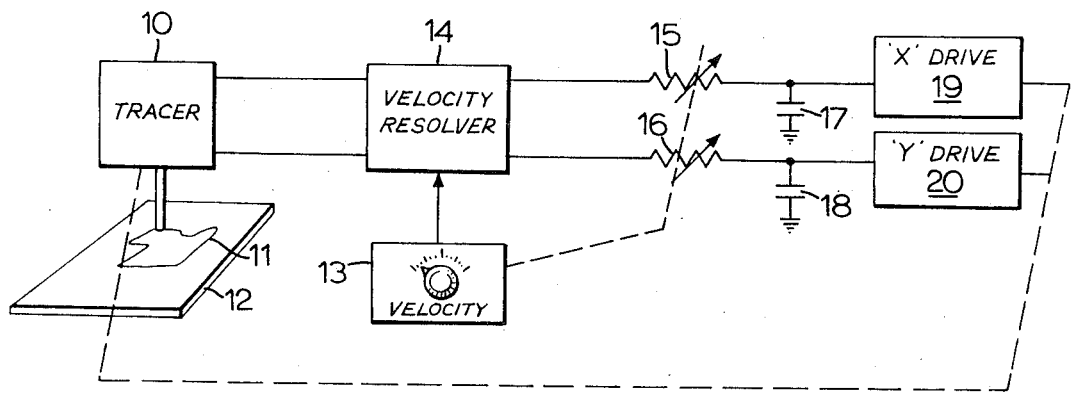
FIG. 3 is a block diagram of a system incorporating a delay in accordance with this invention.

As has been shown in FIG. 1, if the diameter of the scan of the tracer is substantial, errors occur when rapid changes of direction are encountered in the pattern. In accordance with this invention corrections for these errors are obtained by introducing delay between the velocity resolver and the X drive and Y drive. As shown in FIG. 3 this delay consists of simple RC networks comprising resistors 15 and 16 and capacitors 17 and 18. As will be readily understood, the combination of the resistor 15 and the capacitor 17 introduces a delay in the signal applied from the velocity resolver 14 to the X drive and this delay is a time delay dependent upon the values of the resistor and the capacitor. Because it is a time delay, it will evidently have varying effects depending upon the velocity of the tracer which is determined by the velocity control 13.

As is shown in FIG. 2, with 0 delay, the cut follows the path 8. It can be shown that with an introduction of a suitable delay, the cut will follow path 9 and with still greater delay the cut will follow the path 9a, etc. Because the delay introduced is a time delay and the correction desired is a spacial correction, it is necessary to correlate the delay with the velocity. To this end, it will be seen that variable resistors 15 and 16 are mechanically coupled to the velocity control 13. In this way, as the velocity is increased the correction is decreased so that at maximum velocity it is possible that the inherent delays in the system provide sufficient overshoot to produce the preferred contour while at lower speeds further delays must be introduced.

The calculation of the desired delay expressed as a distance may be ascertained from the following. The delay is assumed to be distance kl where k is a constant and l is the lead of the apparatus or scan radius. The curves in FIG. 2 illustrate in 8 a situation where $k$ equals 0, 9 where k equals 0.5, and 9a where $K$ equals 0.7. In order that this can remain essentially constant with speed, it is necessary that the variable resistors 15 and 16, which are ganged to the velocity control, obey a law such that their resistance is inversely proportional to the velocity. By selection of the maximum of resistance introduced the characteristic of this system is established giving a result as shown, for example, in FIG. 2 as curve 9. Adjustment of the velocity will result in this curve remaining substantially the same over the various possible operating velocities of the system.

It will be evident that this same end may be obtained in other manners by utilizing the velocity control to vary the delay time. As an alternative, for example, resistor 15 could be a resistor whose value is adjustable by means of an applied voltage and whose resistance decreases with applied voltage.

It will be apparent that devices of this sort include semiconductors, vacuum tubes, etc., when properly arranged. Alternatively, it may be possible to vary the value of the capacitors or even introduce delay lines having variable delay. In some systems the production of the X and Y signals in the velocity resolver may be subject to modification to produce the desired delay. An example of a means of introducing such a delay is the system disclosed in copending Canadian application Ser. No. 065,212, filed Oct. 20, 1969, and assigned to the assignee of the present application.

The embodiments of the invention in which an exclusive property or privilege is claimed are defined as follows:

1. An optical pattern following servo control mechanism, means to cause the apparatus to follow a pattern with substantially constant tangential velocity with respect to the pattern by causing the tracer to have suitable coordinate velocities with respect to a point to be maintained at fixed relationship to said pattern, comprising means to view the pattern in advance of the position of said point, means to produce signals representative of the position of said point relative to the position of the point viewed on said pattern, means to utilize the resultant signals to produce said coordinate velocities and means to time delay said signals before application to said means to produce said coordinate velocities so that said delay is a function of the said tangential velocity of said tracer.

2. An optical pattern following servo control mechanism as claimed in claim 1 wherein said delay is produced by a resistance capacity delay network which is adjustable in conjunction with the adjustment of the tangential velocity of said tracer.

3. An optical pattern following servo control mechanism as claimed in claim 1 wherein the time delay introduced is so related to the tangential velocity that the result is a substantially constant spatial delay.

* * * * *